(12) United States Patent
Ferguson et al.

(10) Patent No.: US 7,887,020 B2
(45) Date of Patent: Feb. 15, 2011

(54) SEAT TRACK LOCKING MECHANISM

(75) Inventors: Keith Michael Ferguson, Colorado Springs, CO (US); Othar P. Kennedy, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 586 days.

(21) Appl. No.: 12/052,243

(22) Filed: Mar. 20, 2008

(65) Prior Publication Data
US 2008/0238124 A1 Oct. 2, 2008

Related U.S. Application Data

(60) Provisional application No. 60/908,133, filed on Mar. 26, 2007.

(51) Int. Cl.
*F16M 13/00* (2006.01)
(52) U.S. Cl. .................... 248/429; 248/424; 297/344.1
(58) Field of Classification Search ............... 248/424, 248/429; 297/344.1, 344.11
See application file for complete search history.

(56) References Cited

U.S. PATENT DOCUMENTS

| | | | |
|---|---|---|---|
| 3,076,629 A | 2/1963 | Henry-Biabaud | |
| 3,450,425 A | 6/1969 | Leonhardt | |
| 4,232,895 A | 11/1980 | Yoshio et al. | |
| 5,816,110 A | 10/1998 | Schuler et al. | |
| 6,234,575 B1 | 5/2001 | Schuler et al. | |
| 6,260,922 B1 * | 7/2001 | Frohnhaus et al. | 297/330 |
| 6,318,696 B1 | 11/2001 | Downey et al. | |
| 6,322,036 B1 | 11/2001 | Tame et al. | |
| 6,405,988 B1 * | 6/2002 | Taylor et al. | 248/429 |
| 6,575,421 B1 * | 6/2003 | Houston et al. | 248/429 |
| 6,648,292 B2 | 11/2003 | Flick et al. | |
| 6,688,692 B2 | 2/2004 | Phillips et al. | |
| 6,736,457 B2 | 5/2004 | Elio et al. | |
| 7,159,942 B2 | 1/2007 | Costaglia | |

(Continued)

FOREIGN PATENT DOCUMENTS

DE 626327 C 2/1936

(Continued)

*Primary Examiner*—Terrell Mckinnon
*Assistant Examiner*—Steven M Marsh
(74) *Attorney, Agent, or Firm*—Jerry J. Holden; John D. Titus

(57) ABSTRACT

An apparatus for adjusting the position of a seat comprises a rack and a clock nut that grips the rack. The rack comprises a threaded rod, while the clock nut comprises a short cylindrical body that is drilled and threaded along its diameter with internal threads corresponding to the thread diameter and pitch of the rack. Circumferential reliefs are then formed in the threaded bore to enable the clock nut to be "clocked" from a position in which the threads of the clock nut engage the threads of the rack to a second position in which the threads of the clock nut disengage the threads of the rack. A pair of linkages are provided to rotate the clock nut between the engaged and disengaged positions and to transmit loads from the clock nut. Because the clock nut engages multiple teeth of the rack simultaneously, the seat track locking mechanism of the present invention is capable of extremely fine position adjustment without sacrificing ruggedness and because of the design of the linkages, the seat track locking mechanism locks bi-directionally and with little or no backlash.

18 Claims, 4 Drawing Sheets

U.S. PATENT DOCUMENTS

| | | | |
|---|---|---|---|
| 7,661,647 B2 * | 2/2010 | Ito | 248/429 |
| 7,669,824 B2 * | 3/2010 | Woehrle et al. | 248/429 |
| 2004/0206878 A1 * | 10/2004 | Borbe et al. | 248/424 |
| 2006/0237619 A1 * | 10/2006 | Nakamura | 248/429 |

FOREIGN PATENT DOCUMENTS

| | | | |
|---|---|---|---|
| DE | 1430281 A1 | 5/1969 |
| DE | 4102312 A1 | 8/1992 |
| DE | 4436221 C1 | 2/1996 |
| EP | 0436366 A2 | 7/1991 |
| WO | 97/02153 A1 | 1/1997 |

\* cited by examiner

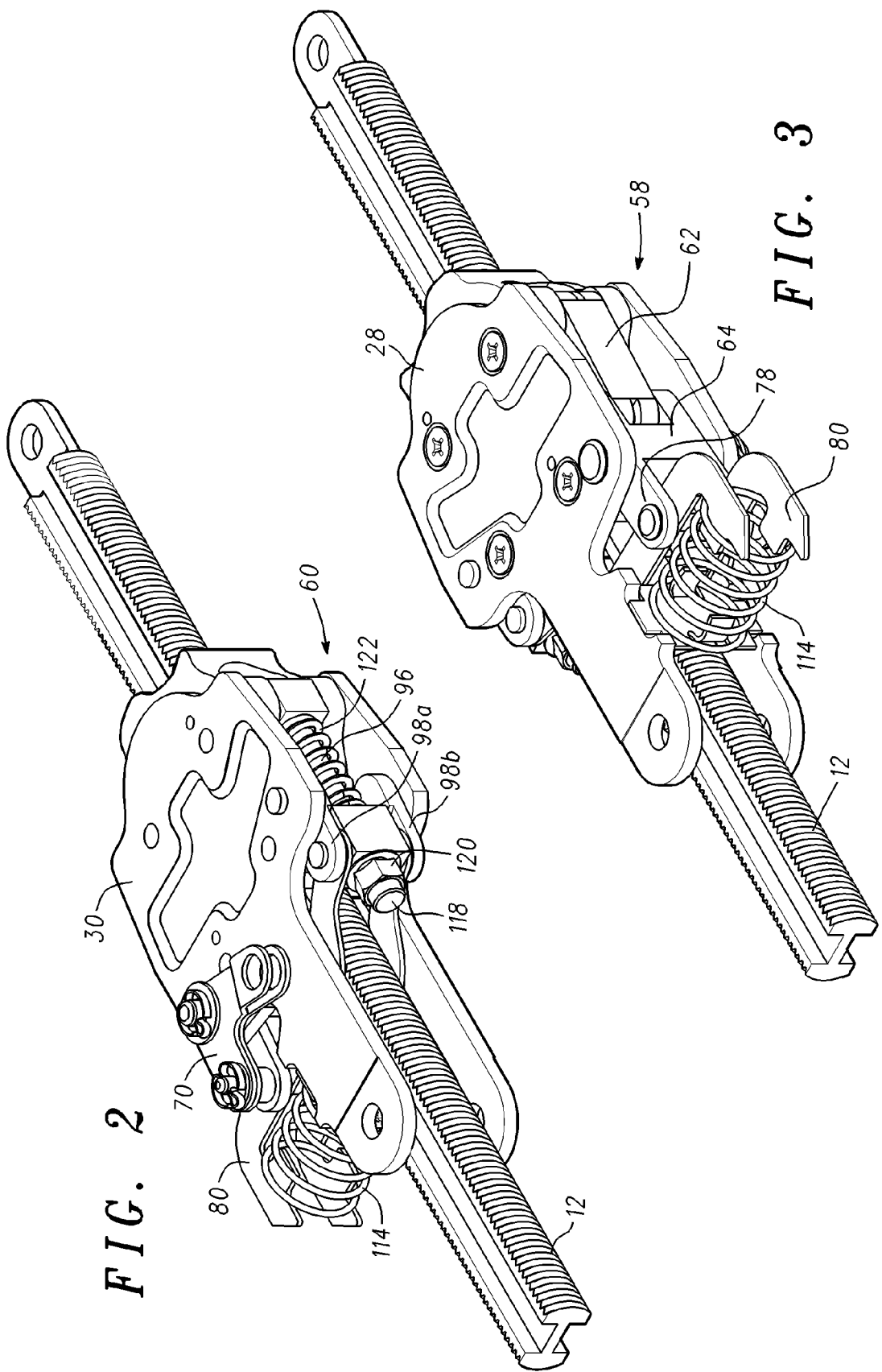

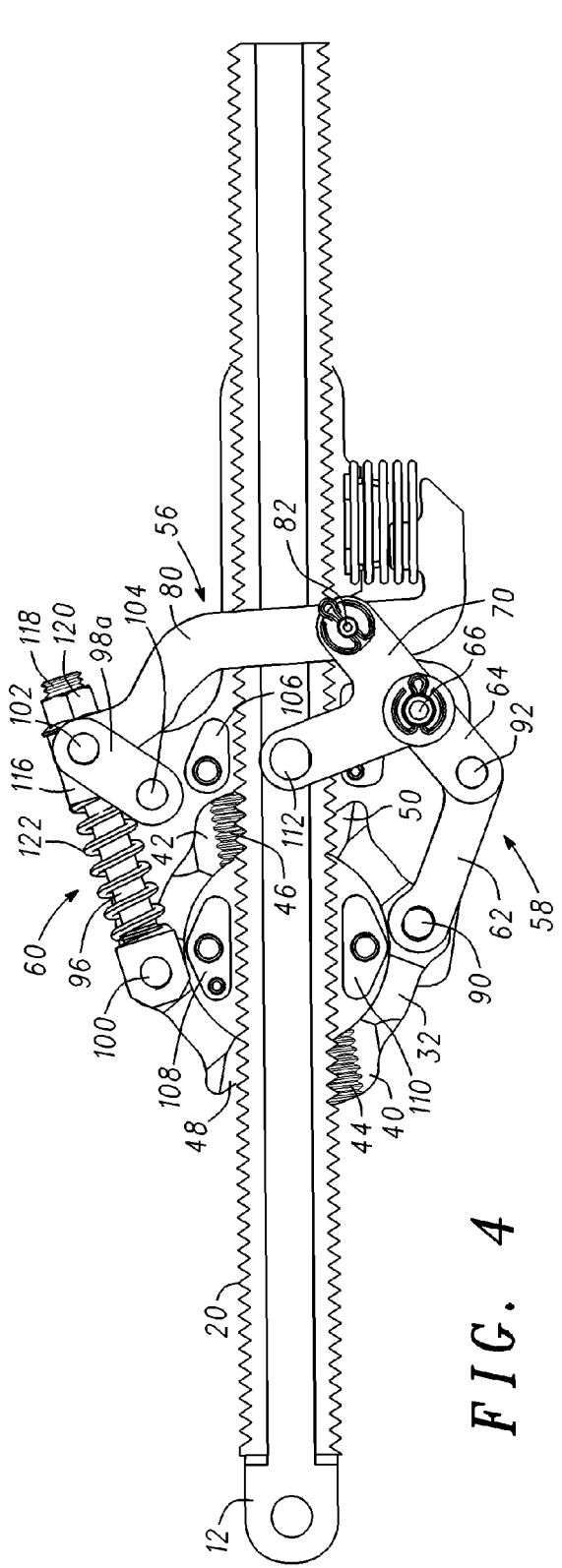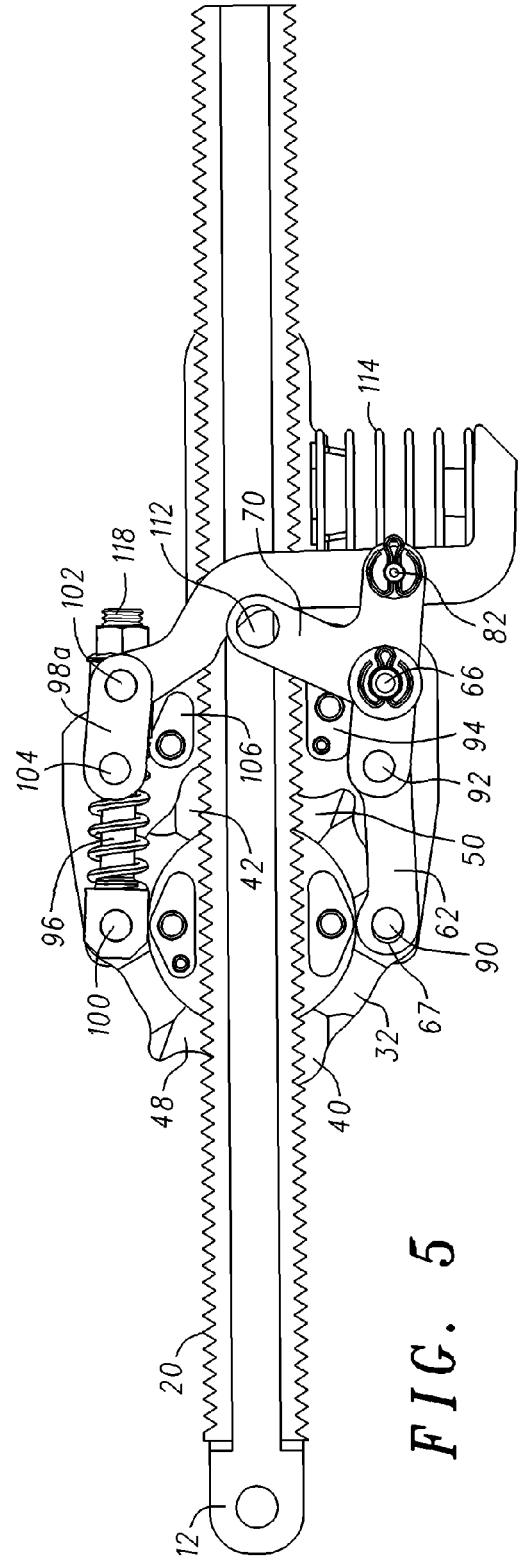

SEAT TRACK LOCKING MECHANISM

CROSS-REFERENCE TO RELATED APPLICATION

The application claims priority of U.S. provisional application No. 60/908,133 filed Mar. 26, 2007.

BACKGROUND OF THE INVENTION

The present invention relates to vehicle seat systems and, more particularly, to locking mechanisms for adjustable vehicle seats.

Many aircraft and other vehicle seating applications have a requirement that the seat be able to translate in one or more directions. Once translated, the seat must be securely locked in its new location and once locked, the seat must be able to withstand various use/abuse loads, in-flight gust loads, and crash loads. Conventional seat track locking mechanisms typically employ a track member that contains a plurality of slots or holes spaced along the length of the track. The other track member has a pin or shaft that is selectively engaged with one of the holes or slots to lock the track members together. When the pin is disengaged from the hole, the tracks can move relative to one another. Once the seat is in the desired position, the pin is re-engaged in a corresponding slot or hole.

A disadvantage of this type of locking assembly is that there are only a finite number of adjustment positions, since each slot or hole defines one seat position. In order for the locking mechanism to be sufficiently robust to meet the load requirements, the pins and holes of the locking mechanism must be made sufficiently robust (i.e., large) and therefore the pitch between available locked positions is relatively coarse. Additionally, with the conventional pin and hole locking mechanisms, sufficient clearance between the pin and hole must be allowed to facilitate easy engagement of the pin with the hole. This, however, can lead to undesirably noisy and uncomfortable backlash when the seat is in the locked position.

Another type of seat locking mechanism employs a unidirectional friction lock consisting of a rod and a collar that slides over the rod. The collar is biased along one edge by a spring that causes the collar to wedge against the rod. This type of mechanism enables infinite adjustment, but because the collar can only hold in a single direction, two complete mechanisms are required to lock the seat in position. Moreover, because this type of mechanism relies on friction to hold the seat in position, it will slip if a heavy load is applied. Accordingly, seats equipped with this type of mechanism must be moved to a special position and locked in place if heavy loads are anticipated, for example, during aircraft take-off and landing. What is needed is a seat locking mechanism that is capable of holding in two directions with a single mechanism that is sufficiently robust to meet the foregoing load requirements yet is capable of fine adjustments with little or no backlash in the locked position.

SUMMARY OF THE INVENTION

The present invention solves the foregoing problem by providing an apparatus for adjusting the position of the seat that comprises a rack and a clock nut. According to one embodiment of the invention, the rack comprises a threaded rod having a standard Unified, American National or SI thread profile. The clock nut of the illustrative embodiment comprises a short cylindrical "hockey puck" shaped body that is drilled and tapped along a diameter of the cylinder with internal threads corresponding to the thread diameter and pitch of the rack. In the illustrative embodiment, a second hole is cut along the cylindrical axis of the puck that intersects the threaded bore leaving two discrete threaded bores near the perimeter of the puck. Circumferential reliefs are then cut in the threaded bore to enable the puck to be "clocked" from a position in which the threads of the clock nut engage the threads of the rack, to a second position in which the threads of the clock nut disengage from the threads of the rack. A pair of linkages are provided to rotate the clock nut between the engaged and disengaged positions and to transmit loads from the clock nut. The linkages are designed so that lateral loads from the clock nut are reacted bi-directionally and with little or no backlash. Because the clock nut engages multiple teeth of the rack simultaneously, the seat track locking mechanism of the present invention is capable of extremely fine position adjustment without sacrificing ruggedness and because of design of the linkage, the seat track locking mechanism does so bi-directionally and with little or no backlash.

BRIEF DESCRIPTION OF THE DRAWING

The present invention will be better understood from a reading of the following detailed description, taken in conjunction with the accompanying drawing figures in which like references designate like elements and, in which:

FIG. 2 is a top perspective view of the seat track locking mechanism of FIG. 1 as assembled;

FIG. 3 is a bottom perspective view of the seat track locking mechanism of FIG. 2;

FIG. 4 is a top view of the seat track locking mechanism of FIG. 1 with the cover plate removed showing the mechanism in the disengaged position;

FIG. 5 is the seat track locking mechanism of FIG. 4 in the engaged position.

DETAILED DESCRIPTION

Figure 1:
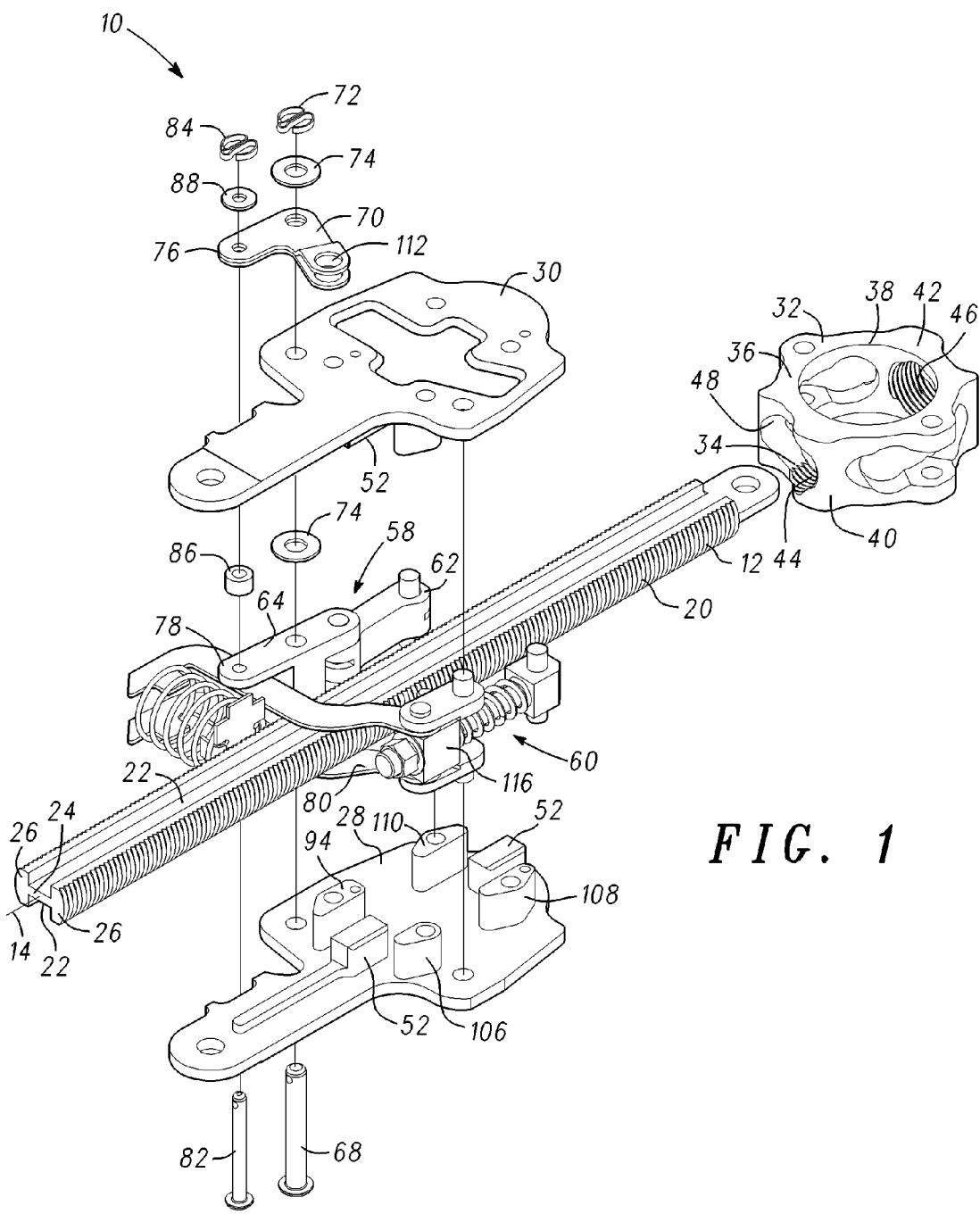
FIG. 1 is an exploded perspective view of a seat track locking mechanism incorporating features of the present invention.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

Figure 6:
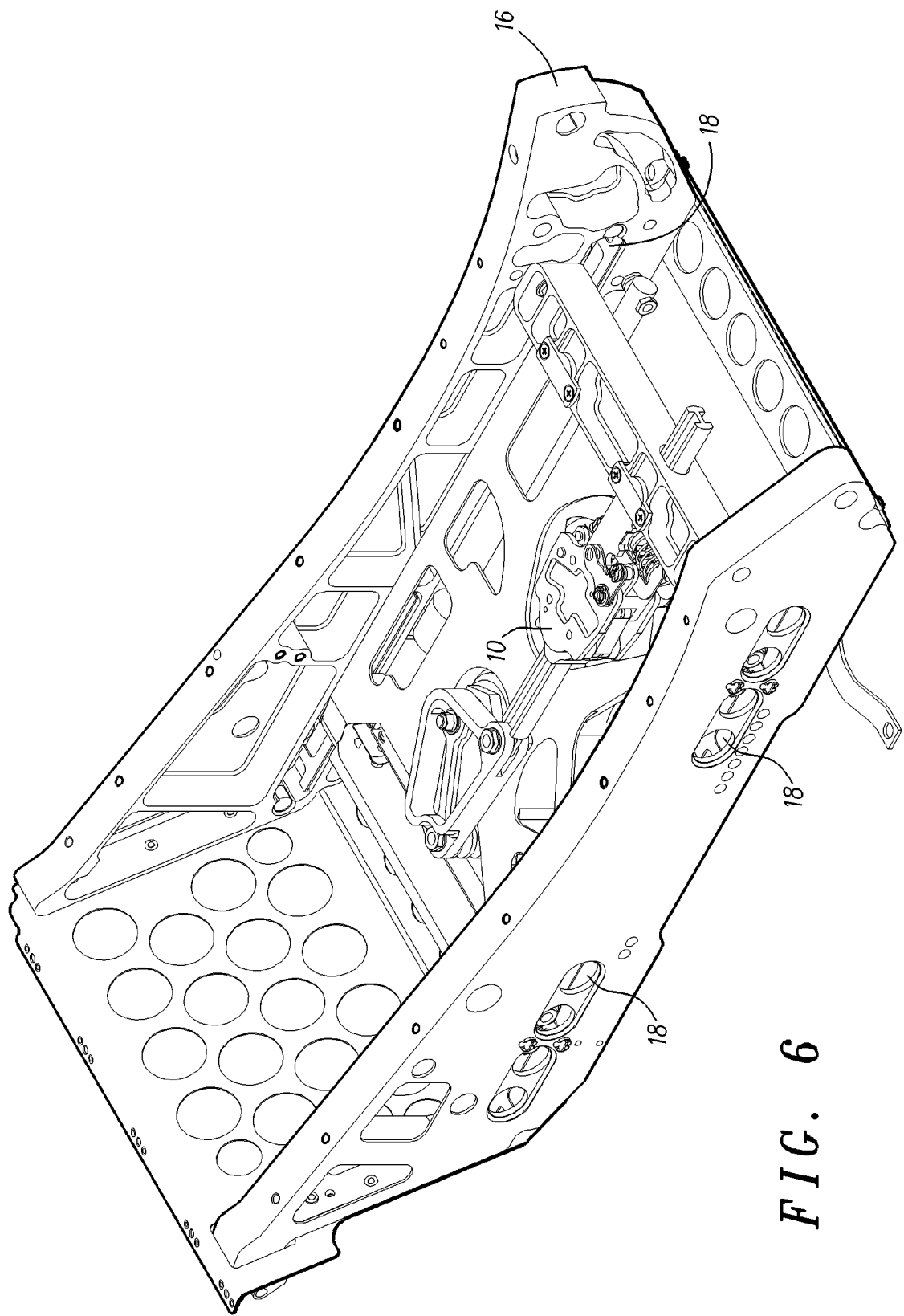
FIG. 6 is a perspective view of a seat frame incorporating the seat track locking mechanism of FIGS. 1-5.

With reference to FIGS. 1-5, seat track locking mechanism 10 comprises a rack 12, which in the illustrative embodiment is mounted to the vehicle frame so that the longitudinal axis 14 of rack 12 is parallel to the direction of motion of the vehicle seat 16 along its track 18 (FIG. 6). Rack 12 is formed with a series of external threads 20 formed, for example by machining on a geared lathe or by running rack 12 through a threading die, so that external threads 20 run substantially the entire length of rack 12. In the illustrative embodiment threads 20 comprise 5/8-18 UNF class 2 threads. Rack 12 is further formed, e.g., by machining a pair of longitudinal grooves 22, leaving rack 12 with a substantially "I"-shaped cross-section with a continuous web portion 24 and flanges 26 incorporating the external threads 20. In addition to reducing the unnecessary weight of rack 12, grooves 22 center rack 12 as it slides across the guide lands 52 located on lower cover plate 28 and upper cover plate 30.

Seat track locking mechanism 10 further comprises a clock nut 32 which comprises a generally short cylindrical "hockey puck" shaped body which is formed, e.g., by machining to include a first bore 34 along a chord of the circular face 36 of clock nut 32, preferably along the diameter of the circular face 36 of clock nut 32. A second bore 38 is formed in clock nut 32, e.g., by machining, to intersect first bore 34 thereby separating first bore 34 into a discrete first jaw portion 40 and second jaw portion 42. First bore 34 is formed, e.g., by tapping, to have internal threads 44 and 46 that correspond to the diameter and pitch of external threads 20 of rack 12 (e.g., 5/8-18 UNF class 2). The internal threads 44 and 46 of first bore 34 may be formed either before or after second bore 38 is formed but in either event are formed in a continuous operation so that internal threads 44 and internal threads 46 have a continuous helical pitch and, therefore, a threaded rod inserted and threaded into internal thread 44 would continue to thread without binding through internal thread 46.

A portion of each internal threads 44 and 46 are removed, e.g., by machining away, to form reliefs 48 and 50, the function of which can be seen most clearly with reference to FIGS. 4 and 5. As can be seen from FIG. 4, first jaw portion 40 and second jaw portion 42 have internal threads 44 and 46 respectively that are the same diameter and pitch as the external threads 20 of rack 12 and therefore grip rack 12 as would a conventional nut. Reliefs 48 and 50, however, enable clock nut 32 to be rotated ("clocked") to a position where internal threads 44 and 46 are disengaged from external threads 12 and rack 12 is capable of simply sliding through clock nut 32 by passing through reliefs 48 and 50. When clock nut 32 is clocked back into the position shown in FIG. 5, internal threads 44 and 46 of first jaw portions 40 and 42 engage external threads 20 of rack 12 as jaw members 40 and 42 engage the sides of rack 12.

Seat track locking mechanism 10 further comprises the necessary linkage for clocking or rotating the clock nut from the disengaged to the engaged position and for locking it in the engaged position against unintentional release. Clocking linkage 56 comprises a first toggle linkage 58 that is loaded in compression when moving clock nut 32 into the closed position and a second toggle linkage 60 that is loaded in tension when moving clock nut 32 into the closed position. First toggle linkage 58 comprises a compression link 62 and a toggle input link 64. Toggle input link 64 is pinned at the central pivot point 66 by pin 68 which passes through lower cover plate 28, upper cover plate 30, and input lever 70. Pin 68 is retained to input lever 70 with cotter pin 72 and spacer washers 74 as required. The output end 76 of input lever 70 is pinned to the end 78 of toggle input link 64 and crossover link 80 by means of pin 82 which is retained by means of cotter pin 84, spacer 86 and washer 88 as required.

Compression link 62 is pivotably connected to clock nut 32 at pivot 90 and is pivotably connected to toggle input link 64 at pivot 92. As first toggle linkage 58 moves clock nut 32 from the disengaged position as shown in FIG. 4 to the engaged position as shown in FIG. 5, first toggle linkage 58 moves from a substantially over-center position to a very slightly (approximately 5°) over-center position on the opposite side with toggle input link 64 coming to rest against limit stop 94. Once in this position, any force on clock nut 32 attempting to move clock nut 32 from the engaged to the disengaged position merely presses toggle input link 64 against limit stop 94 and does not break the linkage open.

Second toggle linkage 60 comprises a tension link 96 and slave links 98a and 98b. Tension link 96 is pivotably attached to clock nut 32 at pivot 100 and is pivotably attached to slave links 98a and 98b and to crossover link 80 at pivot 102. Slave links 98a and 98b are pivotably attached to lower cover plate 28 and upper cover plate 30 at pivot 104. As second toggle linkage 60 moves clock nut 32 from the disengaged position as shown in FIG. 4 to the engaged position as shown in FIG. 5, second toggle linkage 60 moves from a substantially before bottom-dead-center position as shown in FIG. 4 to a slightly (approximately 5°) after bottom-dead-center position with slave links 98a and 98b and/or tension link 96 operatively resting against limit stop 106. With second toggle linkage 60 in this position, any force attempting to move clock nut 32 from the engaged position into the disengaged position places tension link 96 in tension and merely causes slave links 98a and 98b and/or tension link 96 to press against limit stop 106 but does not cause second toggle linkage to rotate past bottom-dead-center and therefore clock nut 32 is held firm. As can be seen from FIGS. 4 and 5, as clock nut 32 is rotated by first and second linkages 58 and 60, clock nut 32 is constrained to move in a circular path by means of guides 108 and 110 secured between lower cover plate 28 and upper cover plate 30.

To allow for minute adjustments, e.g., for controlling backlash, tension member 96 is adjustable in length. This is accomplished by passing tension member 96 through a pillow block 116 that forms the connection between tension member 96 on the one hand and slave links 98a and 98b and crossover link 80 on the other hand. The tip 118 of tension link 96 is threaded to accept a nut 120 that prevents tension link 96 from withdrawing out of pillow block 116 when placed under tension. An anti-rattle spring 122 holds nut 120 firmly against pillow block 116.

As noted above, any force attempting to rotate clock nut 32 from the engaged position to the disengaged position merely causes first toggle linkage 58 and second toggle linkage 60 to press against their respective limit stops thereby preventing clock nut 32 from rotating. The lateral loads on clock nut 32 are also reacted through first toggle linkage 58 and second toggle linkage 60, but in a unique and innovative way. With reference in particular to FIG. 5, a load tending to move cover plate 28 and the balance of seat track locking mechanism 10 along rack 12 to the right of FIG. 5 will cause clock nut 32, which is engaged with rack 12 to place tension link 96 in tension. Because toggle linkage 60 is already in a slightly beyond bottom-dead-center position with slave links 98a and 98b and/or tension link 96 pressing against limit stop 106 (through pillow block 116), the lateral load placing tension link 96 in tension merely causes slave links 98a and 98b and/or tension link 96 to press against limit stop 106 but does not cause second toggle linkage to rotate and therefore clock nut 32 is held firm against the lateral load. Simultaneously, because tension link 96 is offset from the points of contact between jaws 40 and 42, and rack 12, the torque couple caused by the lateral load acting on tension link 96, causes jaws 40 and 42 to rotate more firmly into engagement with rack 12. As can be determined from the foregoing, the action of tension link 96 is effectively load-responsive, since the greater the lateral load, the more firmly clock nut 32 grips rack 12.

To ensure that the lateral load is reacted entirely by tension link 96, clearance 67 between the pin and hole forming first pivot 90 (and/or clearance between the pin and hole forming second pivot 92) prevents a lateral load in this first direction from reacting against first toggle linkage 58. Absent this clearance, that portion of the load reacted against compression link 62 would tend to reduce the torque couple that causes clock nut 32 to grip rack 12 and therefore would diminish the load-responsive action of tension link 96. By ensuring that all of the lateral load in this first direction is reacted by tension link 96 the load-responsive action of tension link 96 is maintained.

A load in the opposite direction, i.e. tending to move cover plate 28 and the balance of seat track locking mechanism 10 along rack 12 to the left of FIG. 5 will cause clock nut 32, which is engaged with rack 12 to place compression link 62 in compression. Because toggle linkage 58 is already in a slightly over-center position with toggle input link 64 against limit stop 94, the lateral load placing compression link 62 in compression merely presses toggle input link 64 against limit stop 94 and does not break the linkage open. Therefore, clock nut 32 is held firm against the lateral load. Simultaneously, because compression link 62 is offset from the points of contact between jaws 40 and 42, and rack 12, the torque couple caused by the lateral load acting on compression link 62, causes jaws 40 and 42 to rotate more firmly into engagement with rack 12. Thus, in this second direction, the action of compression link 62 is effectively load-responsive, since the greater the lateral load, the more firmly clock nut 32 grips rack 12.

At the same time, because tension link 96 is capable of sliding through pillow block 116, a lateral load in this second direction does not place tension link 96 in compression. Absent this sliding connection, that portion of the load reacted against tension link 96 would tend to reduce the torque couple that causes clock nut 32 to grip rack 12 and therefore would diminish the load-responsive action of compression link 62. By ensuring that virtually all of the lateral load in this second direction is reacted by compression link 62, (the force of anti-rattle spring 122 is at least an order of magnitude less than the tensile strength of compression link 62), the load-responsive action of tension link 96 is maintained.

Manual operation of seat track locking mechanism 10 is accomplished by means of an actuator rod (not shown) which is attached to the actuator hole 112 formed in input lever 70. A resilient member such as compression spring 114 urges clock nut 32 into the engaged position and locks first and second toggle linkages 58 and 60 by urging crossover link 80 in the appropriate direction.

Although certain illustrative embodiments and methods have been disclosed herein, it will be apparent from the foregoing disclosure to those skilled in the art that variations and modifications of such embodiments and methods may be made without departing from the spirit and scope of the invention. For example, although in the illustrative embodiment the rack is secured to the vehicle and the clock nut is attached to the seat in certain circumstances, for example, if the clock nut is solenoid-actuated, it may be preferable to mount the clock nut mechanism to the vehicle and mount the rack to the vehicle seat. Additionally other threads including Square, Acme, Whitworth, BSF, buttress and even gear or other teeth profiles (helical or non-helical) may be incorporated, all without departing from the scope of the present invention. Accordingly, it is intended that the invention shall be limited only to the extent required by the appended claims and the rules and principles of applicable law.

What is claimed is:

1. Apparatus for adjusting the position of a seat mounted to a vehicle comprising:
    a rack, said rack comprising an elongate member having a longitudinal axis and a lateral surface, the lateral surface having a plurality of external teeth formed therein;
    a clock nut, said clock nut comprising a pair of jaws and a flange extending between said pair of jaws so that each one of said pair of jaws is fixed relative to the other one of said pair of jaws, each one of said pair of jaws having internal teeth corresponding to the external teeth of said rack, each one of said pair of jaws being displaced axially from each other and on opposite sides of the lateral surface of said rack, said clock nut being rotatable about an axis normal to the longitudinal axis of said rack from a first position in which the internal teeth of said pair of jaws engage said external teeth of said rack to a second position in which said internal teeth of said pair of jaws disengage the external teeth of said rack; and
    a linkage capable of rotating said clock nut from said first position to said second position.

2. The apparatus of claim 1, wherein:
the external teeth of said rack and the internal teeth of said pair of jaws comprise helical screw threads.

3. The apparatus of claim 2, wherein:
the internal teeth of said pair of jaws share a continuous fixed helical pitch.

4. The apparatus of claim 1, wherein:
said clock nut comprises a body having a first bore therethrough adapted to receive said rack, wherein said pair of jaws comprise at least a portion of the interior surface of said first bore, said first bore further comprising at least one relief formed therein adjacent said internal teeth for allowing said clock nut to move from said first position to said second position.

5. The apparatus of claim 4, wherein:
said clock nut further comprises a second bore intersecting and interrupting said first bore.

6. The apparatus of claim 1, wherein:
said linkage comprises a first toggle linkage that moves from a first position in which a the first toggle linkage is in a slightly over-center position with a knee of the first toggle linkage adjacent a limit stop, to a second position in which the first toggle linkage is in an opposite-side substantially over-center position with the knee of the first toggle linkage displaced from the limit stop as said clock nut moves from said first position to said second position.

7. The apparatus of claim 6, wherein:
said linkage comprises a second toggle linkage that moves from a first position in which said second toggle linkage is in a slightly past bottom-dead-center position with a knee of the second toggle linkage adjacent a limit stop to a second position in which the second toggle linkage is in an opposite-side substantially before bottom-dead-center position with the knee of the second toggle linkage displaced from the limit stop as said clock nut moves from said first position to said second position.

8. The apparatus of claim 7, wherein:
said first toggle linkage comprises a compression link, said compression link having at least one pivot having a predetermined clearance; and
said second toggle linkage comprises a tension link that slidingly engages a pillow block attached to a pivoting linkage, said tension link further including a stop for preventing said tension link from withdrawing from said pillow block,
whereby a force moving said clock nut in a first linear direction is reacted by loading said tension link in tension prior to said predetermined clearance being taken up by movement of said clock nut, and whereby a force moving said clock nut in an opposite linear direction is reacted solely by loading said compression link in compression with said tension link sliding through said pillow block.

9. The apparatus of claim 8, wherein:
said stop is threaded to said tension link for adjusting the effective length of said link.

10. The apparatus of claim 1, wherein:
said rack is operatively attached to the vehicle and said clock nut is mounted to the seat.

11. Apparatus for adjusting the position of a seat mounted to a vehicle comprising:
a rack, said rack comprising an elongate member having a longitudinal axis and a lateral surface, the lateral surface having a plurality of external teeth formed therein;
a clock nut, said clock nut comprising a body having a first bore therethrough adapted to receive said rack, said first bore having an interior surface, at least a portion of the interior surface of said first bore having internal teeth corresponding to the external teeth of said rack, said first bore further comprising at least one relief formed therein adjacent said internal teeth, said clock nut further comprising a second bore intersecting said first bore; said clock nut being rotatable about an axis intersecting said first bore from a first position in which the internal teeth of said first bore engage the external teeth of said rack to a second position in which the internal teeth of said first bore disengage the external teeth of said rack; and
a linkage capable of rotating said clock nut from said first position to said second position.

12. The apparatus of claim 11, wherein:
said linkage comprises a first toggle linkage that moves from a first position in which said first toggle linkage is in a slightly over-center position with a knee of the first toggle linkage adjacent a limit stop to a second position in which the first toggle linkage is in an opposite-side substantially over-center position with the knee of the toggle displaced from the limit stop as said clock nut moves from said first position to said second position.

13. The apparatus of claim 11, wherein:
said linkage comprises a second toggle linkage that moves from a first position in which the second toggle linkage is in a slightly past bottom-dead-center position with a knee of the second toggle linkage adjacent a limit stop to a second position in which the second toggle linkage is in an opposite-side substantially before bottom-dead-center position with the knee of the second toggle linkage displaced from the limit stop as said clock nut moves from said first position to said second position.

14. The apparatus of claim 11, wherein:
said linkage comprises a link having a threaded end for adjusting the length of said link.

15. The apparatus of claim 11, wherein:
said rack is operatively attached to the vehicle and said clock nut is mounted to the seat.

16. Apparatus for adjusting the position of a seat mounted to a vehicle comprising:
a rack, said rack comprising an elongate member having a longitudinal axis and a lateral surface having a first and a second side, the lateral surface having a plurality of external teeth formed therein;
a clock nut, said clock nut comprising a first jaw, a second jaw and a flange extending between said first and second jaws so that said first jaw is fixed relative to said second jaw, said first and second jaws each having internal teeth adapted to engage the external teeth of said rack, said first jaw positioned adjacent the first side of said rack and said second jaw positioned adjacent the second side of said rack, said first jaw being displaced axially along the longitudinal axis of said rack from said second jaw, said clock nut adapted to rotate about an axis normal to the longitudinal axis of said rack from a closed position in which the internal teeth of said first and second jaws engage said external teeth of said rack to an open position in which said internal teeth of said first and second jaws disengage the external teeth of said rack; and
a load-responsive linkage adapted to rotate said clock nut from said open position to said closed position and hold said clock nut in said closed position with a torque that increases with load, said linkage comprising a first linkage attached to said clock nut on the first side of said rack and said second linkage attached to said clock nut on the second side of said rack, said first linkage applying a force to said clock nut in a first direction relative to the longitudinal axis of said rack and said second linkage applying a force to said clock nut in a second, substantially opposite, direction to rotate said clock nut from said open position to said closed position, said first and second linkages cooperating to generate a first torque couple between said clock nut and said first linkage when a load is applied to said rack in a first direction and to generate a second torque couple between said clock nut and said second linkage when a load is applied to said rack in a second, opposite, direction, said first and second torque couple both rotating said clock nut toward said closed position.

17. The apparatus of claim 16, wherein:
said first linkage comprises a toggle, said toggle having at least one pivot having a clearance in the second direction, whereby a load applied to the rack in the second direction causes the clock nut to take up less than all of the clearance, thereby allowing the load to be reacted solely by the second linkage.

18. The apparatus of claim 16, wherein:
said second linkage comprises a crank and connecting rod linkage with the connecting rod engaging the crank through a pillow block, whereby a load applied to the rack in the first direction causes the clock nut to push the connecting rod through the pillow block, thereby allowing the load to be reacted solely by the first linkage.

* * * * *